(12) United States Patent
Astely et al.

(10) Patent No.: US 8,270,516 B2
(45) Date of Patent: Sep. 18, 2012

(54) USING COVARIANCE MATRICES FOR LINK SELECTION IN MIMO COMMUNICATION SYSTEM

(75) Inventors: David Astely, Bromma (SE); Bo Göransson, Sollentuna (SE); Per Skillermark, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 842 days.

(21) Appl. No.: 12/306,132

(22) PCT Filed: Oct. 4, 2006

(86) PCT No.: PCT/SE2006/050374
§ 371 (c)(1),
(2), (4) Date: Feb. 17, 2009

(87) PCT Pub. No.: WO2008/002227
PCT Pub. Date: Jan. 3, 2008

(65) Prior Publication Data
US 2009/0274234 A1    Nov. 5, 2009

(30) Foreign Application Priority Data
Jun. 26, 2006    (WO) ................ PCT/SE2006/050218

(51) Int. Cl.
H04B 7/02    (2006.01)
(52) U.S. Cl. ..................................... 375/267
(58) Field of Classification Search ................ 375/260, 375/267, 295, 316, 340, 346–349; 455/562.1, 455/132, 133–135
See application file for complete search history.

(56) References Cited

U.S. PATENT DOCUMENTS

| 5,799,005 | A  | * | 8/1998 | Soliman ........................ 370/335 |
| 6,901,122 | B2 | * | 5/2005 | Nadgauda et al. ............ 375/347 |
| 6,952,455 | B1 | * | 10/2005 | Banister ........................ 375/267 |
| 6,999,794 | B1 | * | 2/2006 | Lindskog et al. .......... 455/562.1 |
| 7,006,848 | B2 | * | 2/2006 | Ling et al. .................. 455/562.1 |
| 2002/0013130 | A1 |   | 1/2002 | Kim et al. |
| 2007/0099584 | A1 | * | 5/2007 | Niu et al. ...................... 455/101 |
| 2007/0104152 | A1 | * | 5/2007 | Wild et al. .................... 370/335 |
| 2007/0174038 | A1 | * | 7/2007 | Wang et al. ...................... 704/1 |

FOREIGN PATENT DOCUMENTS
WO    WO 2005/036775 A2    4/2005

OTHER PUBLICATIONS

Zander, J. et. at.: "Radio Resource Management for Wireless Networks," Artech House, 2001, MA. USA, ISBN: 1-58053-146-6, Chapter 5.

Vucetic, B et al: "Space-Time Coding", John Wiley & Sons Ltd, Apr. 2003, England, ISBN: 0-470-84757-3. Chapter 1.

* cited by examiner

*Primary Examiner* — Khanh C Tran

(57) ABSTRACT

A method of selecting at least one communication link in a wireless communication network is proposed, comprising the steps of transmitting from at least one transmitting node in the network a pilot signal from each of at least two transmitter antennas of the transmitting node, receiving the pilot signals from the at least two transmitter antennas in a receiving terminal, estimating, in the terminal, a covariance matrix of the channel, based on the pilot signals received, determining the pathloss for each antenna based on the covariance matrix, selecting one of at least two possible links for the communication between the terminal and the transmitting nodes. The terminal is enabled to measure on each transmitter antenna individually, which provides a better tool for link selection and cell selection.

30 Claims, 2 Drawing Sheets

USING COVARIANCE MATRICES FOR LINK SELECTION IN MIMO COMMUNICATION SYSTEM

TECHNICAL FIELD

The present invention relates to optimization of communication in a wireless network. In particular the invention relates to a method and an apparatus for the optimization of selection of communication links in a wireless network.

BACKGROUND AND PRIOR ART

In wireless communication systems multiple antennas are often used in base stations and terminals to increase the coverage, especially for high data rate services in wide area scenarios. The multiple antennas help achieve this by introducing the possibility of beam forming as well as spatial diversity and efficient provisioning of very high data rates by means of spatial multiplexing. Beam forming, in particular, is used to increase the quality of a particular communication link.

When a terminal wishes to set up a connection to the network, it is important to select a link that will provide adequate communication quality. To assist selection of communication link in a system having multiple antennas according to the prior art cell defining reference signals (pilots) are transmitted. The base station typically transmits a cell defining pilot, typically consisting of one or two reference signals with a fixed set of beam forming weights. For example, each reference signal may be transmitted from one of the antennas. This pilot signal is transmitted continuously or periodically. The mobile terminals perform measurements on this pilot signal. Based on these measurements a terminal can determine which cell it hears best and select this cell, or, when needed, initiate a handover by sending a measurement report to the network.

The pilot signal is chosen so that it can be received in a large area by all visiting terminals. Typically, a cell defining pilot is transmitted in a wide beam covering a 120 degree sector. In contrast, with beamforming, the dedicated data intended for one particular terminal is typically transmitted in narrower beams. There may then a mismatch between the quality of the cell defining pilot and the quality of the communication link using beamforming.

Another example, is Wideband Code Division Multiple Access (WCDMA) with transmit diversity. Here, cell selection is based on measurements of reference signals transmitted from two antennas over the entire cell. The terminal then adds the measurements of the reference signals corresponding to the individual antennas to use as input data for the selection of an appropriate cell. This again means that the quality of the pilot signal used to select the base station with which to communicate may differ significantly from the quality of the communication link once the cell has been selected when beamforming is used. This, since the cell selection is based on reference signals that do not reflect the properties of the communication link that will result if beam forming is used.

OBJECT OF THE INVENTION

It is an object of the invention to provide a method and an apparatus to improve the selection of communication link or links between two or more units in a wireless communication system, especially cell selection.

SUMMARY OF THE INVENTION

This object is achieved according to the present invention by a terminal for use in a wireless communication network, said terminal being arranged to receive at least a first and a second pilot signal from at least one transmitting node, each pilot signal comprising at least one reference signal transmitted from at least one transmit antenna, said terminal comprising:

receiving means arranged to receive the pilot signals
estimating means arranged to estimate at least a first and a second covariance matrix of at least a first and a second MIMO channel associated with the at least first and second pilot signals, respectively, each MIMO channel defining properties of a communication link,
determining means arranged to determine a parameter related to the pathloss for the at least first and second MIMO channel, between the at least one transmitting node and the terminal based on the at least first and second covariance matrices respectively in dependence of a processing rule,
transmitting means arranged to transmit control information to a control node in the network in dependence of the pathloss parameters determined for the at least two possible communication links.

The object is also achieved by a method of selecting at least one communication link in a wireless communication network, said method comprising the steps of transmitting from at least one transmitting node in the network at least a first and a second pilot signal, each pilot signal comprising at least one reference signal transmitted from at least one transmit antenna,
receiving the pilot signals in a receiving terminal,
estimating, in the terminal, at least a first and a second covariance matrix of at least a first and second MIMO channel associated with the at least first and second pilot signals, respectively, each MIMO channel defining properties of a communication link,
determining a parameter related to the pathloss for the at least first and second MIMO channel, between the at least one transmitting node and the terminal based on the at least first and second covariance matrices in dependence of a processing rule,
selecting one of at least two possible links for the communication between the terminal and the at least one transmitting node in dependence of the pathloss parameters determined for the at least two possible communication links.

The object is also achieved by a method in a terminal of a wireless communication network for selecting at least one communication link between the terminal and the network, said method comprising the steps of receiving from a transmitting node in the network at least a first and a second pilot signal, each pilot signal comprising at least one reference signal transmitted from at least one transmit antenna,
estimating, in the terminal, at least a first and a second covariance matrix of at least a first and a second MIMO channel associated with the at least first and second pilot signals, respectively, each MIMO channel defining properties of a communication link,
determining a parameter related to the pathloss for the at least first and second MIMO channel, between the at least one transmitting node and the terminal based on the at least first and second covariance matrices in dependence of a processing rule, transmitting control information to the network, in dependence of the pathloss parameters determined for the at least two possible communication links.

Hence, according to the invention a receiving terminal is arranged to measure on each of the transmitter antennas' signals individually using reference signals transmitted from several antennas, estimate the covariance, determining the pathloss, or an equivalent measure according to a processing rule, instead of summing measurements performed on each reference signals separately.

The selection of communication link is improved according to the invention compared to the prior art by taking into account the optimization of the communication link that can be performed by means of beam forming once a link has been selected. This means taking into account not only the quality of the pilots themselves but the potential quality of each link when actually set up.

The processing rule is a general function of the covariance matrix, which may be stored in the terminal or signalled to the terminal from the transmitting node.

The inventive method will lead to substantial performance improvements but may also increase the stability, both of the system as a whole and for the individual users, since better choices will be made for handover. The invention therefore enables efficient exploitation of beam forming.

In a preferred embodiment of the method, the terminal signals path loss information to the transmitting node and the selection of a link is performed by the network.

Alternatively, the terminal may select the link and informs the transmitting node about the selected link. In this case, the terminal may further comprise selection means arranged to select one of the possible communication links, the transmitting means being arranged to transmit to the control node information about the selected communication link as control information. This method may have disadvantages, since the terminal only has limited information about the traffic situation in the network.

In a preferred embodiment, the transmitting means is arranged to transmit to the control node information about the path loss as control information. The control node can then select the communication link to be used.

The inventive method preferably comprises the step of transmitting pilot signals from at least one antenna from at least two transmitting nodes to the terminal, forming in the terminal a covariance matrix for each of the at least two transmitting nodes and selecting the link based on path loss information deduced from the covariance matrix related to at least one possible communication link between each of said at least two transmitting nodes and the terminal.

In this case, the terminal is arranged to receive at least two pilot signals from at least two transmitting nodes, each pilot consisting of a number of reference signals transmitted from a number of transmit antennas. In this case, the estimating means is arranged to estimate a covariance matrix for each transmitting node from the pilot signals received from the respective transmitting node and the determining means is arranged to determine the pathloss for at least two possible communication links between the transmitting nodes and the terminal.

The processing rule preferably uses the covariance matrix of each channel and a weight vector to determine the path loss. The weight vector may be selected from a table of weight vectors found in the terminal so as to minimize the path loss.

In a preferred embodiment the method comprises the step of minimizing the path loss subject to one or several quadratic constraints on the weight vectors.

Alternatively, the path loss may be determined from the maximum eigenvalue of the covariance matrix.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
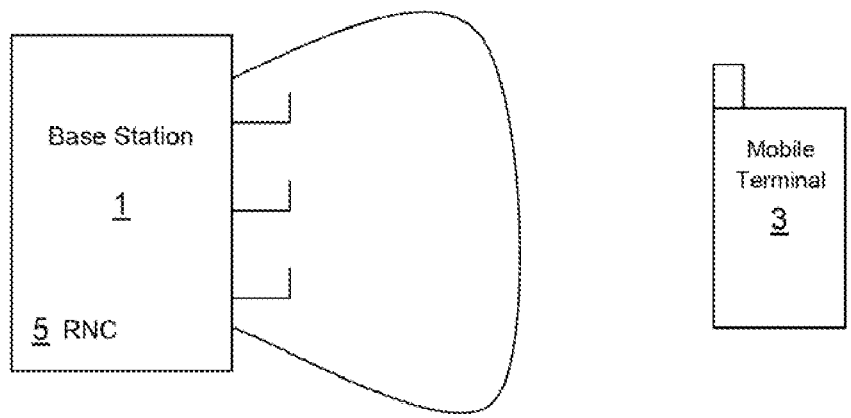
FIG. 1 illustrates a prior art base station having multiple antennas transmitting a cell defining pilot signal.

FIG. 1 illustrates a base station 1 having multiple transmit antennas transmitting a cell defining pilot signal, as is used in the prior art, for example, in WCDMA. A pilot signal, consisting of one or several reference signal is transmitted, and each reference signal is transmitted from the antennas according to assigned transmit weights. A common case is when each reference signal is transmitted from a unique antenna, and all the antennas have the same radiation patterns, or beams. This is illustrated in FIG. 1 as all reference signals being transmitted with the same single lobe. A mobile terminal 3 receives the pilot signal, which consists of several reference signals, and measures the path loss, or received power, on each of the reference signals individually, and finally forms the sum as a measure of pathloss or received power. Typically the terminal receives pilot signals and measures the path loss in several cells. The transmission of pilot signals should be adapted in all dimensions to the envelop, or possible coverage area of the set of available beams, to correctly reflect the coverage area the base station. Since coverage depends on the experienced radio environment and because the hardware realization is not trivial, this generally poses great problems. The base station is connected to other units in the network and is controlled by a control unit, such as a Radio Network Controller (RNC) 5.

Figure 2:
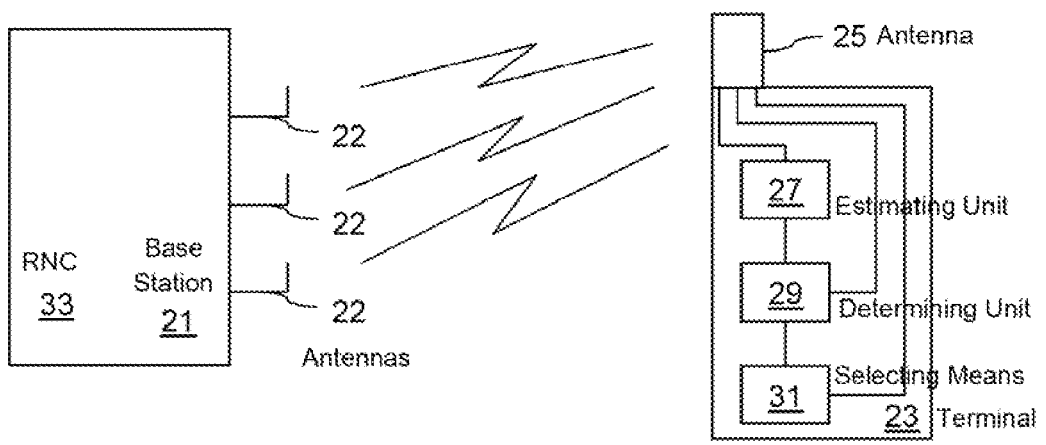
FIG. 2 illustrates a base station having multiple antennas transmitting pilot signals according to the invention.

FIG. 2 illustrates a base station 21 transmitting a pilot consisting of reference signals that are multiplexed from its n antennas 22, according to the invention. These reference signals may be received and used by any terminal that wishes to set up a connection, to assist in link selection. FIG. 2 shows a terminal 23. The terminal 23 receives the signals on one or several antennas 25. According to the invention, the mobile terminal measures on each reference signal. The terminal comprises an estimating unit 27 arranged to form a long term transmitter covariance matrix R, for example by means of estimating the channels associated with each reference signal and forming by means of temporal averaging complex auto- and cross-correlations between channels associated with the respective transmit antenna. Thus, not only the average received powers are determined, as is the case in prior art, but also the complex cross-correlations. Based on the covariance matrix a determining unit 29 determines a pathloss value accounting for the benefits of beam forming by processing the covariance matrix according to a processing rule. The pathloss value and possibly partial results according to the processing rule is signalled back to the network through a transmitting means, illustrated in FIG. 2 as the antenna 25, according to a reporting rule. The processing rule will be discussed in more detail below. The path loss values or information based on these values may be signalled from the terminal to the transmitting node from the determining means 29 through the antenna 25. Alternatively, a selecting means 31 may be arranged to receive path loss information from the determining means 29, select a link and inform the network, through the antenna 25 of the selected link. In FIG. 2, both of these alternatives are shown. Of course, in a concrete implementation, one of the alternatives, or both, may be implemented. That is, both determining means 29 and selecting means 31, or just the selecting means 31 may be arranged to inform the transmission means. Alternatively, there may be no selecting means, in which case the determining means 29 must be arranged to inform the transmission means. As in FIG. 1, the base station 21 is controlled by a control node, such as an RNC 33.

To enable the calculation of the pathloss value a processing rule may be signalled from the base station as a broadcast message. The processing rule may be related to the intended transmit concept to be used. Based on the processing rule the receiver can calculate the expected impact of the multiple antennas. The processing rule can be viewed, for example, as a generalization of the path gain to the case with multiple inputs and multiple outputs to order that the transmit concept used is to be used for cell selection and/or at handover. Alternatively, the processing rule may be known to all terminals, so that it does not have to be transmitted. It is also possible for a terminal to select one of a number of processing rules stored in the terminal. In this case the terminal comprises selection means (not shown) for performing this selection. The selection may be made in dependence of the properties of the pilot signal received; for example, according to the number of antennas used to transmit the pilot signal. Alternatively, the selection may be made according to a command from the base station.

Hence, according to the invention, distinguishing it from the prior art, not only the actual power of the reference signals, but also the complex correlations between channels associated with reference signals transmitted from different transmit antennas are taken into account when determining the pathloss. In this way a pathloss measure reflecting the potential benefits of beamforming will be obtained. Instead of the pathloss itself an equivalent parameter may be used, such as the received power.

The pilot signal should be transmitted regularly so that a mobile terminal can always perform measurements for cell selection. This may be achieved in a number of ways. For example, in Orthogonal Frequency Division Multiplex (OFDM) a reference signal may be transmitted on a particular carrier that will be transmitted at certain time intervals. In Code Division Multiple Access (CDMA) reference signals may be sent on one or more particular codes, or may be time multiplexed.

The covariance matrix R will be a square matrix having as many rows and columns as the number of transmitter antennas on the base station. For example if three antennas are used, the covariance matrix R will be $$R = \begin{bmatrix} R_{11} & R_{12} & R_{13} \\ R_{21} & R_{22} & R_{23} \\ R_{31} & R_{32} & R_{33} \end{bmatrix} \quad (1)$$

In R, the diagonal elements $R_{11}$, $R_{22}$ and $R_{33}$ represent the power measurements on each reference signal, typically corresponding to one of the antennas. The other elements, $R_{12}$, $R_{13}$, $R_{21}$, $R_{23}$, $R_{31}$ and $R_{32}$ represent the correlation between channels of different antennas. This correlation information can be used to determine how energy should be transmitted from the base station.

For so called eigenbeamforming the maximum eigenvalue of the transmitter channel covariance matrix is the measurement used for cell selection. Processing rules for direction-of-arrival based beam forming with uniform linear arrays as well as code-book based beam forming are easily formulated as they all result in quadratic forms of the transmit covariance matrix. Covariance constraints can be used e.g. to control interference spread to other cells or for spectrum sharing in a future system.

An example of a processing rule is according to the WCDMA specification 25.215 which says: "report the sum of $R_{11}$ and $R_{22}$". This means that only the diagonal elements of the covariance matrix, representing the path gain of each transmit antenna, are measured and used.

If fixed lobes from a codebook are used, the best lobe can be determined using knowledge of the matrix and the weights used by the multiple antennas.

In the following the data model and the transmitter channel covariance matrix will be discussed in more detail. For simplicity an OFDM system is considered, in which the transmitter has $M_T$ transmit antennas and the receiver has $M_R$ receive antennas. With simple modifications the description can be generalized to other types of systems, such as CDMA systems. The samples associated with sub-carrier k and OFDM symbol n are modelled as $$y(k,n)=H(k,n) \times (k,n)+e(k,n) \quad (2).$$

Here, y(k,n) is an $M_R \times 1$ column modeling the signals received by $M_R$ receive antennas, x(k,n) is an $M_T \times 1$ column vector modeling signals transmitted from $M_T$ transmit antennas. Hence, the $M_R \times M_T$ matrix H(k,n) models the MIMO channel for the user under consideration associated with one transmit node.

Note that the channel associated with each carrier experiences the same second order statistics, and for a (quasi-) wide sense stationary scenario, the (local) transmitter channel covariance matrix R may be written as $$R=E\{H^H(k,n)H(k,n)\} \quad (3).$$

The covariance matrix is of size $M_T \times M_T$. If $h_m^H$ denotes the $m^{th}$ row of H, that is, the channels between all the transmit antennas and receive antenna m, then the transmitter channel covariance matrix may also be written as $$R = \sum_{m=1}^{M_R} E\{h_m(n,k) h_m^H(n,k)\}, \quad (4)$$

which may be recognized as a sum of the channel covariance matrices of the terminal's receive antennas. As can be seen, the diagonal elements of the covariance matrix contain the path gain of each transmit antenna, summed over the receive antennas and the complex valued off-diagonal may be viewed as average cross-correlations between the different transmit antennas.

The covariance matrix may be estimated from estimates of the MIMO channel which in turn may be obtained by correlating the received samples with known transmitted reference symbols and averaging in the time and frequency grid within the coherence limits of the channels.

To summarize, the transmit channel covariance matrix may be viewed as a straight forward generalization of the path gain to the MIMO case. According to the present definition, a sum is taken over the receive antennas and not only path gains to the individual transmit antennas are considered but also associated cross correlations. Since the path gain may be measured in the single antenna case, a suitable pilot structure will enable this also in the MIMO case.

With downlink beam forming of a scalar data signal s(n,k) with transmit power $P_{tx}$ the signal transmitted is formed as $$x(n,k) = ws(n,k) \quad (5)$$

where the $M_T \times 1$ column vector w holds the employed transmit weights which are normalized so that $\|w\|=1$. The path gain is now taken as the signal power, summed over all receive antennas and divided by the transmit power. Using the definitions above we see that that the path gain may be written as $$G = P_{rx}/P_{tx} \quad (6)$$

$$= \sum_{m=1}^{M_R} E\{|h_m^H ws(n,k)|^2\}/P_{tx}$$

$$= w^H \left( \sum_{m=1}^{M_R} E\{h_m(n,k)h_m^H(n,k)\} \right) w$$

$$= w^H R w$$

As can be seen the path gain is a function of the transmit weights and the transmitter channel covariance matrix. This definition of the path gain is suitable for use with the present invention. Further, in beam forming, especially long-term beam forming, as is considered in the present invention, weights are determined using knowledge of the transmitter channel covariance matrix and are typically chosen to maximize the path gain. Thus, the processing rule signaled to the roaming terminals determines beam forming weights as a function of the transmitter channel covariance matrix.

Since different beam forming techniques may be used by different base stations in a network, it is envisioned that a message representing processing rule may be signaled by network to the terminal as well. If only a single beam forming technique is employed, then there is of course no need to signal this. Otherwise, since a relatively small number of techniques are believed to be simultaneously supported, the signaling will be a small number of bits.

To summarize, the invention provides a function so that the terminal can determine a path gain measurement as a function of the defined transmitter channel covariance matrix. The path gain measurement accounts for the possible benefits of beam forming.

Next, some specific embodiments will be discussed.

In the case of long-term eigenbeamforming the weight vector w for transmission is given by the eigenvector associated with the largest eigenvalue of the covariance matrix, that is $$w_{ebf} = \arg \max_{w} \; w^H R w \quad (7)$$
$$s.t. \; w^H w = 1$$

In this case, the path gain measurement becomes $$G_{ebf} = w_{ebf}^H R w_{ebf} = \lambda_{max}(R) \quad (8)$$

Where $\lambda_{max}(\cdot)$ denotes the largest eigenvalue of its argument. Hence, the pathgain measurement is simply the largest eigenvalue of the covariance matrix. The weight vector or the covariance matrix may be signalled to the network together with the pathgain measurement.

In the future it may be desirable to enable spectrum sharing, that is, several operators, each with its own infrastructure (of the same future standard) sharing a common spectrum. In this case the long-term eigenbeamforming may be extended with spectrum sharing constraints. For example, a base station may only be allowed to transmit in certain directions in order not to disturb other operators' systems. A possible solution may be to use the spatial dimension and to impose constraints on the covariance matrix. In this case, it is possible that a set of constraint matrices $\{Q_i\}$ is broadcasted and that the beam forming weight vector w is selected as $$w_{ebf} = \arg \max_{w} \; w^H R w \quad (9)$$
$$s.t. \; w^H Q_i w \leq 1$$

In this case, parameters of a processing rule, the constraint matrices, may be updated on slow basis. Further, given the beam forming weights, the path gain measurement is easily obtained and signalled, possibly with the weights, to the network.

An alternative to the beam forming methods discussed above will be code-book based beam forming. In this case, an agreed code-book of possible transmit weights is used, which may be similar to the closed loop transmit diversity modes of WCDMA. The code book, therefore, is a table of all possible lobes that may be created by the transmitter by assigning different weights to the antennas. Such a code book may be constructed using vector quantization techniques, in ways that are known to the skilled person.

The terminal may on a slow basis select a suitable vector from the code book. In this case, the path gain value may be formed as $$G_{cb} = \max_{i} \; w_i^H R w_i \quad (10)$$

where $\{w_i\}$ is the set of transmit weights. The index of the best transmit weights may be signalled to the network together with the path gain measurement.

An example of a code book is given in Table 1. For this example, it is assumed that the base station has three transmit antennas A1, A2, and A3. Five different lobes can be generated, using the five different vectors $w_1$-$w_5$. The table lists, as an example only, the weight that should be used for each antenna to generate the different vectors.

TABLE 1

Examples of antenna weight vectors to create five different beams

|  | Antenna 1 | Antenna 2 | Antenna 3 |
| --- | --- | --- | --- |
| $w_1$ | 1 | 1 | 1 |
| $w_2$ | 1 | j | −j |
| $w_3$ | 1 | j | j |
| $w_4$ | 1 | 1 − j | 1 − j |
| $w_5$ | 1 | 1 − j | 1 − j |

The terminal can measure the channel to each antenna and measure the covariance matrix. Having done that, the terminal can select the best weight vector of $w_1$-$w_5$.

Figure 3:
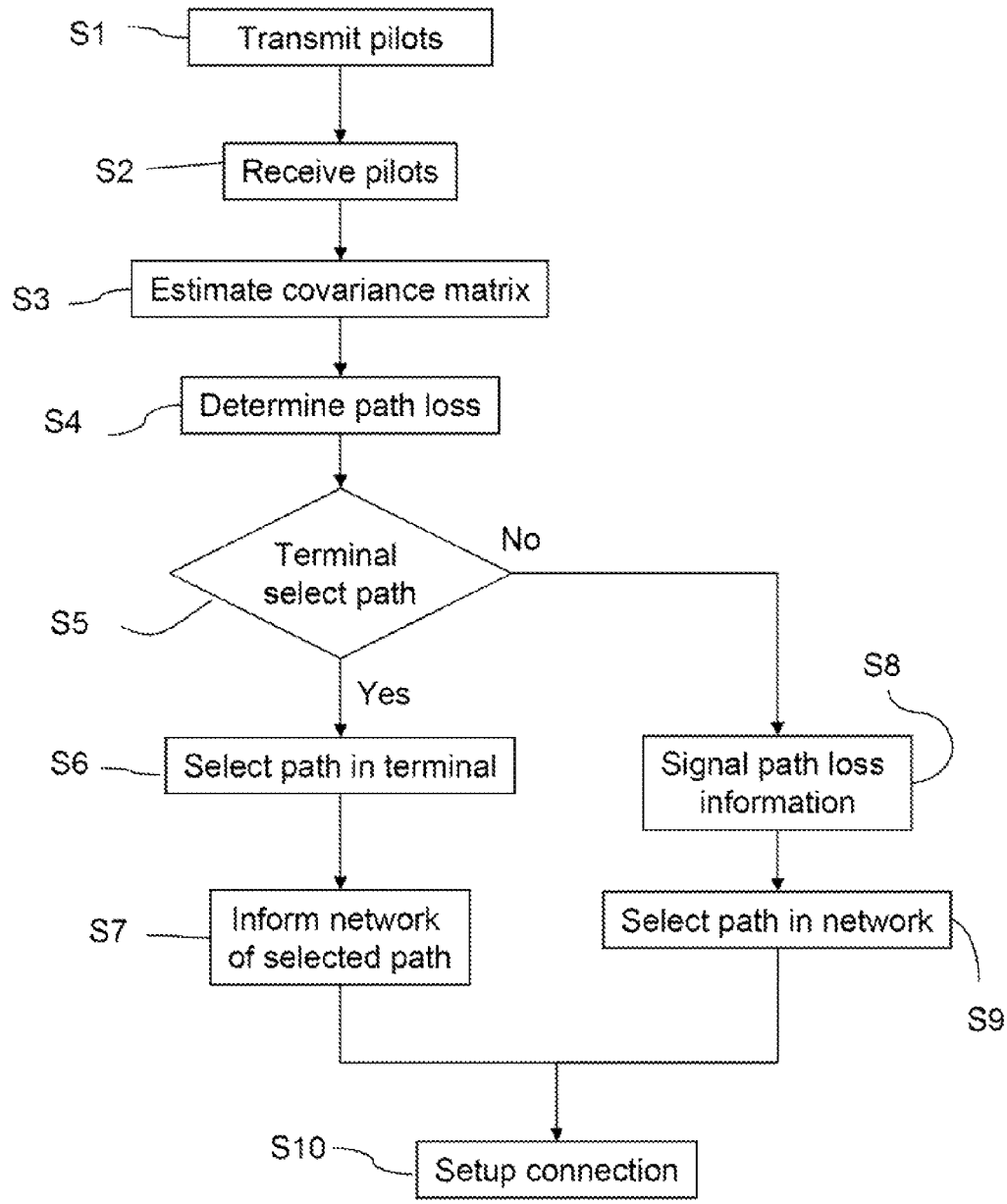
FIG. 3 is a flow chart of the method according to the invention

FIG. 3 is a flow chart of an overall method according to the invention. In step S1 a pilot signal consisting of one or several reference signals is transmitted from the transmitter antennas of at least one base station. The reference signals are transmitted as separate signals to be measured individually. If there are more than one base station, at least one of the base stations should have two or more transmitter antennas.

In step S2 the pilot signals are received by the terminal.

In step S3 the terminal estimates the covariance matrix of the channels. If pilot signals are received from more than one base station, a covariance matrix is estimated for each of the base stations.

In step S4 the terminal determines the path loss using the covariance matrix or matrices estimated in step S3 according to a given processing rule.

Step S5 is a decision step. If the terminal itself should select the link, go to step S6; if the network should select the link, go to step S8.

In step S6 the terminal selects the link it wants to use when communicating with the network, and in step S7 it informs the network about the selected link. Go to step S10.

In step S8 the terminal signals path loss information to the network and in step S9 the network selects the link to be used for communication between the terminal and the network.

In step S10 the selected connection is set up between the terminal and the network in the way common in the art.

This procedure is typically performed periodically or when signalled from a control node in the network.

When something is said to be performed by the network this means that it is performed by a unit in the network, for example, a control node such as an RNC or a controlling entity in an access node. It is probably most feasible to let the network select the link, since the network has more information about the overall situation than a terminal can have. This means that usually steps S8 and S9 will be performed, rather than steps S5 and S6. If it is decided that one branch should always be used, the decision step S5 is not needed. Instead the procedure may pass directly from step S4 to step S6 or step S8.

The proposed solution may be easily extended to support macro diversity, that is, to the case in which the downlink signal is transmitted by multiple base station sites. In such a case the terminal may estimate and report path loss measurements and partial results according to a reporting rule from several base station sites in the same way as when it receives the signal from a single base station. It is also possible that the different antennas may be located at different base stations, or sites. In this case, the beam forming can be considered as a generalized macro diversity transmission.

When the terminal has informed the network of pathloss measurements of a set of cells, it will preferably be up to the network to make decisions about the communication links, since the network has knowledge of the overall traffic situation that may affect the decision. For example the appropriate Radio Network Controller (RNC) of the network may make the decisions. It will also be possible to let the terminal order the network to select a particular lobe; however, this may have undesirable effects.

The invention claimed is:

1. A terminal for use in a wireless communication network, said terminal being arranged to receive at least a first and a second pilot signal from at least one transmitting node, each pilot signal comprising at least one reference signal transmitted from at least one transmit antenna, said terminal comprising:

receiving means arranged to receive the pilot signals; an estimating means arranged to estimate at least a first and a second transmit covariance matrix of at least a first and a second MIMO channel associated with the at least first and second pilot signals, respectively, each MIMO channel defining properties of at least a possible communication link, determining means arranged to determine a parameter related to the pathloss for the at least first and second MIMO channel, between the at least one transmitting node and the terminal based on the at least first and second transmit covariance matrices respectively in dependence of a processing rule, which is a general function of the transmit covariance matrix transmitting means arranged to transmit control information to a control node in the network in dependence of the pathloss parameters determined for the at least two possible communication links.

2. A terminal according to claim 1, wherein the transmitting means is arranged to transmit to the control node information about the path loss as control information.

3. A terminal according to claim 1, further comprising selection means arranged to select one of the at least two possible communication link and wherein the transmitting means is arranged to transmit to the control node information about the selected communication link as control information.

4. A terminal according to claim 1, arranged to receive pilot signals from at least two transmitting nodes, each transmitting on a number of transmitting antennas, wherein the estimating means is arranged to estimate a covariance matrix from the pilot signal received from the respective transmitting node and the determining means is arranged to determine the pathloss for at least one possible communication link between each of the transmitting nodes and the terminal.

5. A terminal according to claim 1, wherein the determining means is arranged to use a processing rule which uses the covariance matrix of each channel and a weight vector to determine the path loss.

6. A terminal according to claim 5, wherein the weight vector is selected from a table of weight vectors found in the terminal so as to minimize the path loss.

7. A terminal according to claim 5, wherein the determining means is arranged to minimize the path loss subject to one or several quadratic constraints on the weight vectors.

8. A terminal according to claim 1, wherein the determining means is arranged to determine the path loss from the maximum eigenvalue of the covariance matrix.

9. A terminal according to claim 1, wherein the receiving means is arranged for receiving information from the transmitting nodes about a processing rule to be used for determining the path loss.

10. A terminal according to claim 1 further comprising selecting means for selecting a processing rule, from at least two processing rules stored in the terminal, in dependence of properties of the at least one pilot signal.

11. A method of selecting at least one communication link in a wireless communication network, said method comprising the steps of transmitting from at least one transmitting node in the network at least a first and a second pilot signal, each pilot signal comprising at least one reference signal transmitted from at least one transmit antenna, receiving the pilot signals in a receiving terminal, estimating, in the terminal, at least a first and a second transmit covariance matrix of at least a first and a second MIMO channel associated with the at least first and second pilot signals, respectively, each MIMO channel defining properties of a communication link, determining a parameter related to the pathloss for the at least first and second MIMO channel, between the at least one transmitting node and the terminal based on the at least first and second transmit covariance matrices in dependence of a processing rule, which is a general function of the transmit covariance matrix, selecting one of at least two possible links for the communication between the terminal and the at least one transmitting node in dependence of the pathloss parameters determined for the at least two possible communication links.

12. A method according to claim 11, wherein the terminal signals path loss information to the transmitting node and the selection of a link is performed by the transmitting node.

13. A method according to claim 11, wherein the terminal selects the link and informs the transmitting node about the selected link.

14. A method according to claim 11, comprising the step of transmitting pilot signals from at least two transmitting nodes to the terminal, forming in the terminal a covariance matrix for the pilot signal received from the respective transmitting node and selecting the link based on path loss information for at least one communication link between each of the transmitting nodes and the terminal.

15. A method according to claim 11, wherein the processing rule uses the covariance matrix of each channel and a weight vector to determine the path loss.

16. A method according to claim 15, wherein the weight vector is selected from a table of weight vectors found in the terminal so as to minimize the path loss.

17. A method according to claim 15, comprising the step of minimizing the path loss subject to one or several quadratic constraints on the weight vectors.

18. A method according to claim 11, comprising the step of determining the path loss from the maximum eigenvalue of the covariance matrix.

19. A method according to claim 11, further comprising the step of transmitting from the transmitting node to the terminal information about a processing rule to use for determining the path loss.

20. A method according to claim 11, further comprising the step of selecting, in the terminal, one of at least two processing rules stored in the terminal.

21. A method in a terminal of a wireless communication network for selecting at least one communication link between the terminal and the network, said method comprising the steps of receiving from a transmitting node in the network at least a first and a second pilot signal, each pilot signal comprising at least one reference signal transmitted from at least one transmit antenna, estimating, in the terminal, at least a first and a second transmit covariance matrix of at least a first and second MIMO channel associated with the at least first and second pilot signals, respectively, each MIMO channel defining properties of at least a possible communication link, determining a parameter related to the pathloss for the at least first and second MIMO channel, between the at least one transmitting node and the terminal based on the at least first and second transmit covariance matrices in dependence of a processing rule, which is a general function of the transmit covariance matrix, transmitting control information to the network, in dependence of the pathloss parameters determined for the at least two possible communication links.

22. A method according to claim 21, wherein the terminal signals path loss information to the transmitting node to enable the selection of a link by the transmitting node.

23. A method according to claim 21, wherein the terminal selects the link and informs the transmitting node about the selected link.

24. A method according to claim 21, comprising the steps of receiving pilot signals from at least two transmitting nodes to the terminal, forming in the terminal a covariance matrix for the pilot signal received from each of the at least two transmitting nodes and determining path loss information for at least one possible communication link between each of the transmitting nodes and the terminal.

25. A method according to claim 21, wherein the processing rule uses the covariance matrix of each channel and a weight vector to determine the path loss.

26. A method according to claim 25, wherein the weight vector is selected from a table of weight vectors found in the terminal so as to minimize the path loss.

27. A method according to claim 21, comprising the step of minimizing the path loss subject to one or several quadratic constraints on the weight vectors.

28. A method according to claim 21, comprising the step of determining the path loss from the maximum eigenvalue of the covariance matrix.

29. A method according to claim 21, further comprising the step of receiving in the terminal information from the transmitting node about a processing rule to use for determining the path loss.

30. A method according to claim 21, further comprising the step of selecting, in the terminal, one of at least two processing rules stored in the terminal.

* * * * *